V. DI SANTE.
AIR FILTER.
APPLICATION FILED OCT. 7, 1918.
1,319,572.
Patented Oct. 21, 1919.
2 SHEETS—SHEET 1.
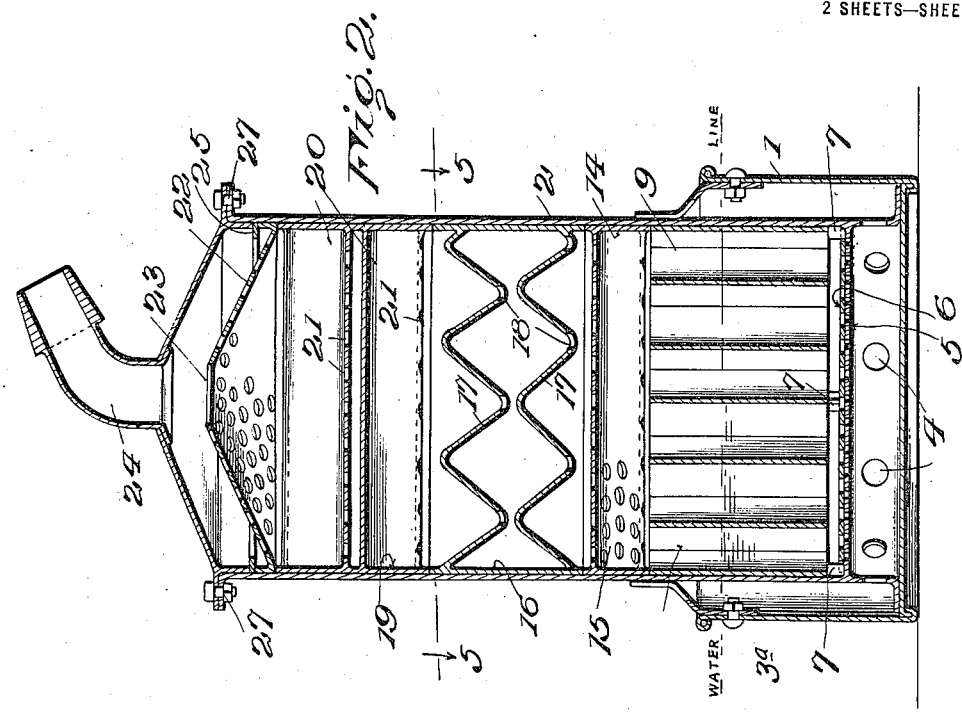
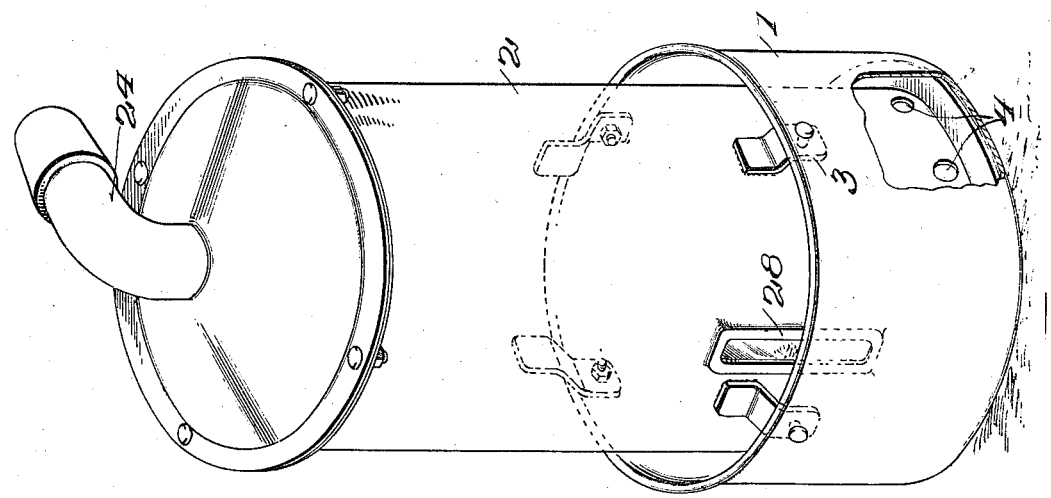
Inventor
Vito Di Sante.

V. DI SANTE.
AIR FILTER.
APPLICATION FILED OCT. 7, 1918.
1,319,572.
Patented Oct. 21, 1919.
2 SHEETS—SHEET 2.
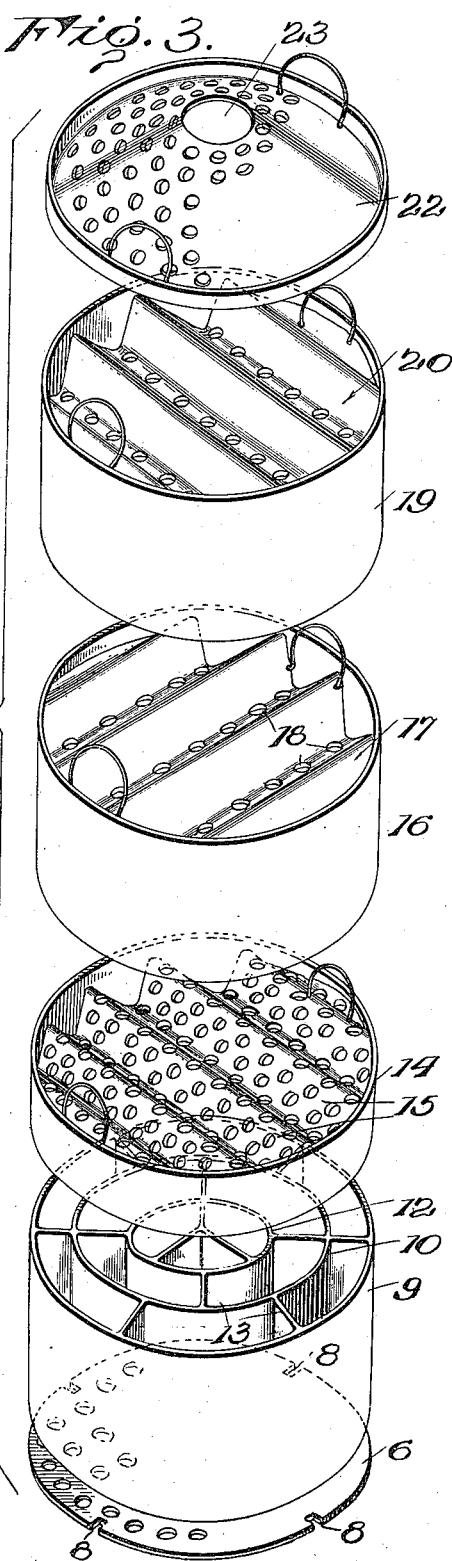
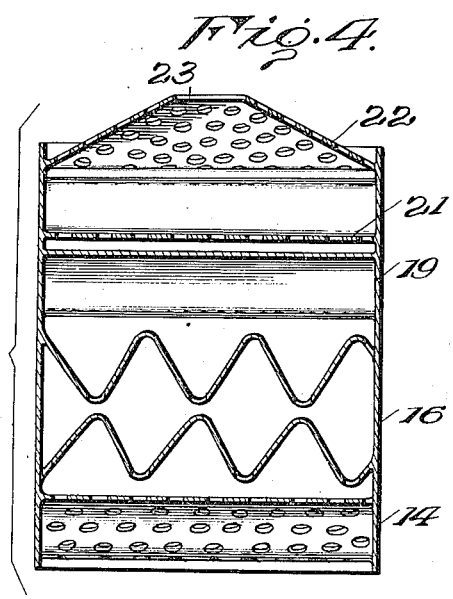
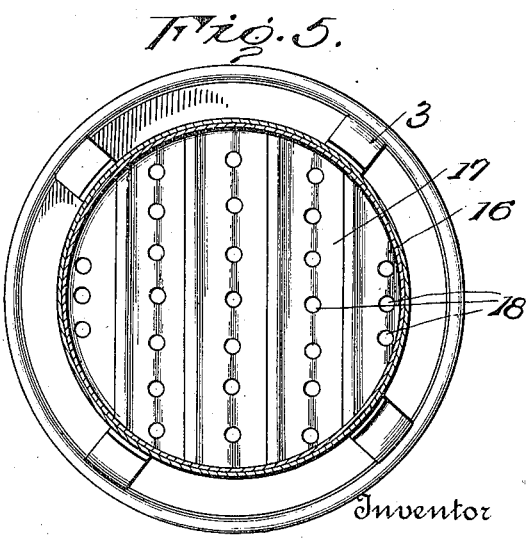
Inventor
Vito Di Sante.
By
Attorney

UNITED STATES PATENT OFFICE.

VITO DI SANTE, OF WICHITA, KANSAS.

AIR-FILTER.

1,319,572.  Specification of Letters Patent.  Patented Oct. 21, 1919.

Application filed October 7, 1918. Serial No. 257,236.

*To all whom it may concern:*

Be it known that I, VITO DI SANTE, of Wichita, in the county of Sedgwick and State of Kansas, have invented certain new and useful Improvements in Air-Filters; and I do hereby declare the following to be a full, clear, and exact description of the invention, such as will enable others skilled in the art to which it appertains to make and use the same.

The present invention relates to apparatus for purifying the air fed to carbureters of internal combustion engines, and contemplates improving the structure embraced by Letters Patent No. 1,288,393, issued to me December 17, 1918.

Figure 1 of the accompanying drawings is a perspective of a filter embodying my improvement. Fig. 2 is a central vertical sectional view. Fig. 3 is a perspective of the parts removed. Fig. 4 is a slight modification and Fig. 5 is a section on line 5—5, Fig. 2.

The cylindrical water container, opened at its top, is designated at 1 and the collecting vessel at 2. This vessel is of cylindrical formation and is mounted upright in the container, its lower end being bent to form supporting flanges. The parts 1 and 2 are secured together by brackets 3 which maintain them properly spaced apart, as at 3ª. The vessel 2 has a plurality of openings 4 near its lower end and above these it is provided with a perforated plate 5. A second perforated plate 6 rests upon plate 5 and its perforations are out of alinement with those of plate 5. The plate 6 is engaged by lugs 7 on the wall of the vessel 2 projecting into notches 8 in the plate to permit its vertical movement but prevent its turning axially.

Above the plates the collecting vessel contains a chamber 9 having a series of compartments. As shown this chamber is cylindrical to conform to the vessel and is formed with two concentric walls 10, 12, the circular spaces formed by these walls being divided by partitions 13.

Above the chamber 9 I have shown a tray 14 whose bottom surface is fluted and each of the flutes 15 is perforated over its entire surface.

Next above tray 14 is a tray 16 having two series of flutes 17 arranged at right angles to the flutes 15 and perforated only at the lower apex of each flute, as at 18.

On top of tray 16 I have shown a third tray 19, similar to tray 16, having two series of flutes 20 arranged at right angles with those of tray 16 or parallel with the flutes of tray 14 and perforated only at their bottoms or lower apices as at 21.

I have shown a conical cover 22 having its entire surface perforated and formed with a centrally enlarged opening 23 in line with a pipe 24 which leads from the collecting vessel 2 to a carbureter. The enlarged opening 23 weakens the suction and prevents the water being carried out with the air.

As shown in Figs. 1, 2 and 3 each of the parts 14, 16, 19 and 22, is equipped with handles for insertion and removal of the parts into and from the vessel 2. As shown in Fig. 4 all of these parts are formed in one integral structure readily adapted to be placed within the collecting vessel. This construction is of advantage under some circumstances from the manufacturer's standpoint. The trays are held in the vessel by a washer 25 and the top 26 of the vessel is bolted as at 27. I have shown vessel 2 provided with a gage 28.

It will be apparent that my object of providing improved means for thoroughly freeing the air of impurities before it enters the carbureter is fully attained by the construction described. The air enters the space 3ª between compartments 1 and 2. This air and the water or other liquid under the suction pass through the plates 5 and 6 and plate 6 is lifted by the suction to the extent allowed by chamber 9. The zigzag course through which the air travels effectively frees it of the water so that when it reaches pipe 24 it is moist but thoroughly purified.

The formation of the parts described prevents splashing when the automobile in which the device is installed is traveling over rough roads and insures the liquid returning to its container. This is primarily true of chamber 9 which causes the fluids to pass upward to the separating trays in even columns. I have found the fluted and perforated formation of these trays of great advantage because while they allow the air and water to pass through, they also partially arrest the water at each successive stage and their imperforate slanting walls provide surfaces over which the arrested water may flow back without seriously retarding the flow of air. This feature is promoted by arranging some of the trays at right angles to others.

I claim as my invention:

1. In an air filter, the combination with a water container, of a collecting vessel mounted in said container, perforated plates in said vessel, a cylindrical chamber above said plates having concentric walls, and partitions dividing the spaces formed by said walls and a separating tray above said chamber.

2. In an air filter, the combination with a water container, of a collecting vessel mounted in said container having means for successively separating the water from the air, comprising perforated plates near the bottom of said vessel, a tray above said plates having its bottom surface fluted and perforated, a second superposed tray having two series of fluted surfaces disposed at right angles to the flutes of said former tray and having perforations at the lower apices of the flutes.

3. In an air filter, the combination with a water container, of a collecting vessel mounted in said container, perforated plates near the bottom of said vessel, a chamber having a series of compartments above said plates through which plates and compartment the air and water are drawn by suction, a tray above said chamber having a perforated and fluted surface to allow the travel of the fluids and partially arrest the water, a second superposed tray having two series of fluted surfaces disposed at right angles to the flutes of said first tray and having perforations at the lower apices of the flutes, to further arrest and return the water to said container, a third superposed tray having a fluted surface whose flutes are parallel with those of said first tray and perforated at their lower apices to further separate the water from the air, an outlet pipe in the top of said vessel, and a conical perforated screen above said last mentioned tray having a central opening in line with said outlet pipe through which the moist purified air passes.

In testimony whereof I have signed this specification.

VITO DI SANTE.